United States Patent [19]

Mason

[11] 4,016,728
[45] Apr. 12, 1977

[54] DEVICE FOR SEVERING UNDERWATER CABLES

[76] Inventor: Burton Hoster Mason, P.O. Box 504, Covington, La. 70433

[22] Filed: Nov. 19, 1975

[21] Appl. No.: 633,549

[52] U.S. Cl. .................................. 61/69 R; 30/278; 83/390; 83/440; 83/461; 83/580; 83/639; 114/221 A

[51] Int. Cl.² ...................... B63C 11/00; B26B 3/00

[58] Field of Search ............ 61/69 R, 63; 166/54.5, 166/54.6; 114/221 A; 83/639, 390, 461, 580, 440, 373; 30/278

[56] References Cited

UNITED STATES PATENTS

| | | | |
|---|---|---|---|
| 228,556 | 6/1880 | Pike | 61/69 R |
| 3,056,267 | 10/1962 | McKee | 61/63 |
| 3,584,529 | 6/1971 | Wallace | 83/580 X |
| 3,763,738 | 10/1973 | Temple | 83/369 X |
| 3,780,689 | 12/1973 | Giebel | 114/221 A |
| 3,915,043 | 10/1975 | Smith et al. | 83/580 X |

*Primary Examiner*—Jacob Shapiro
*Attorney, Agent, or Firm*—Marvin Feldman; Stephen E. Feldman

[57] ABSTRACT

A device is attachable to an outwardly extensible, rotatable arm of a manned submergible chamber and is formed with a horizontally pivoted gate to engage and hold a cable upon rotation of the arm. The device is provided with a track-mounted blade to sever the cable; the blade being actuated from within the manned chamber. In another embodiment, the device is capable of gripping the cable before severing, severing the cable and then permitting the severed cable to be lifted to the surface while continuing to grip the cable. The device is particularly useful for removing entangled cables from an underwater work area, such as an offshore drilling station.

29 Claims, 9 Drawing Figures

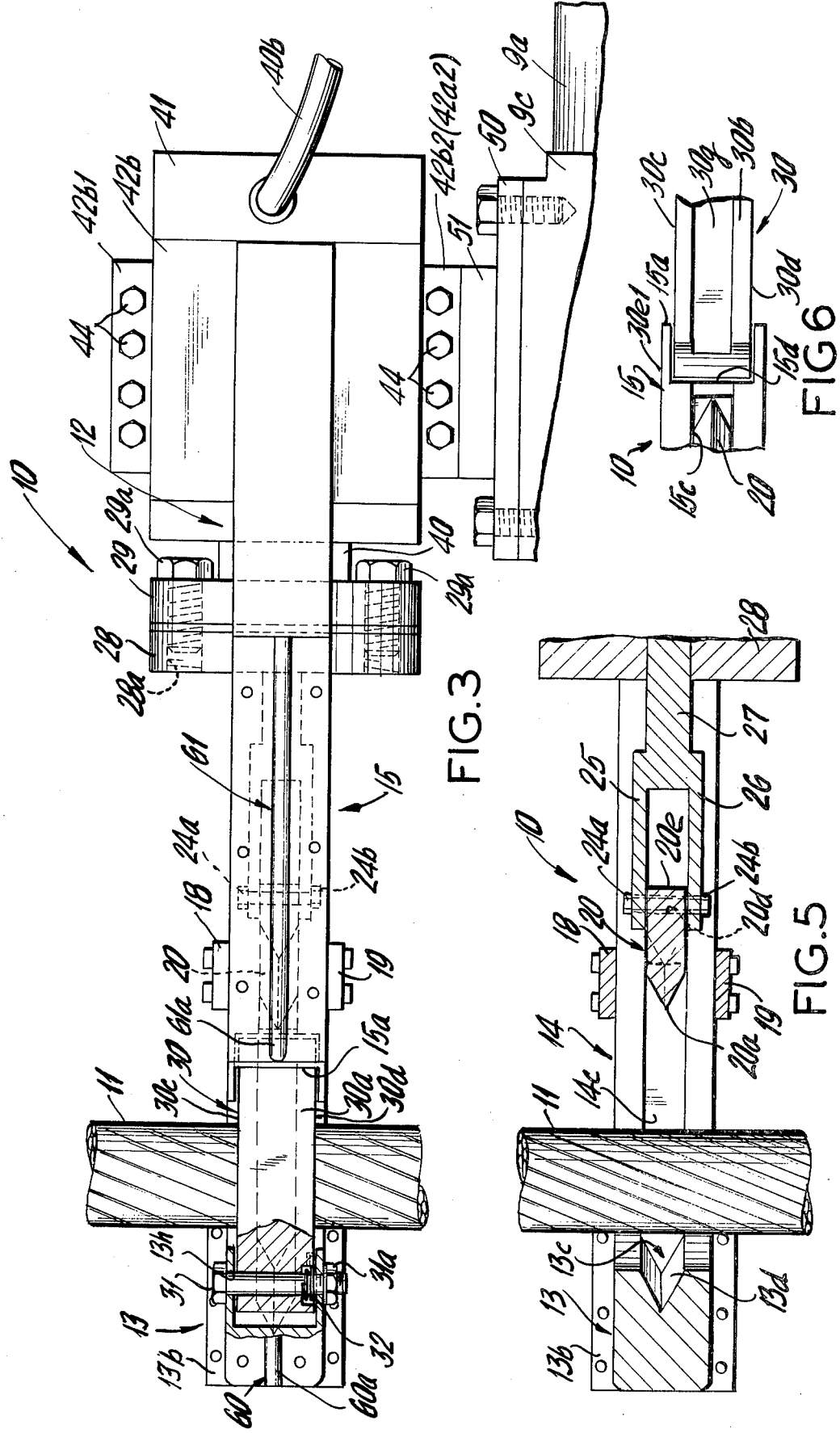

DEVICE FOR SEVERING UNDERWATER CABLES

This invention relates to a cable severing device. Specifically this invention relates to underwater cable severing device which is adaptly connected to a manned submersible chamber and which may be remotely operated from within the chamber.

Heretofore it was known to drag tow lines to sever mine cables at some randomly engaged position.

Underwater cables used in undersea operations, such as oil wells, had to be severed at a specific location by divers employing hand operated implements. With the ever increasing depths at which such undersea operations must take place, the use of divers becomes difficult and costly.

Now disclosed herein is a device for accurately severing an undersea cable without the need for divers or tow lines. The said device controllably engages the cable at a specifically desired location and the cable is then severed by remotely actuated means from within a submerged chamber.

The device of this application may be specifically utilized with the submergible system of U.S. Pat. No. 3,851,491.

It is therefore an object of this invention to provide a device for engaging and severing undersea cables which device is remotely operable from a manned submerged chamber.

It is a further object of this invention to provide a device for severing underwater cables as aforesaid which engages and encompassingly holds the cable for accurate severance thereof without diver assistance.

It is still a further object of this invention to provide a device for severing underwater cables as aforesaid which severs the cable by a retractable advancing blade transversely disposed to a cable that is held within the device.

It is still a further object of this invention to provide an underwater cable severing device which is mounted to one end of a horizontally rotatable arm and which engages the cable during rotation of the arm.

It is still a further object of this invention to provide an underwater cable severing device wherein the cable is grippingly held prior to severing and after severing the cable is brought to the surface by the gripped portion of the cable.

The aforesaid as well as other objects and advantages as will be apparent from the following detailed description and the accompanying drawings wherein.

FIG. 3 is a sectional view taken along line 4—4 of FIG. 2;

FIG. 5 is a partial sectional view taken along line 5—5 of FIG. 2;

FIG. 6 is an elevational view taken along line 6—6 of FIG. 2;

Figure 1:
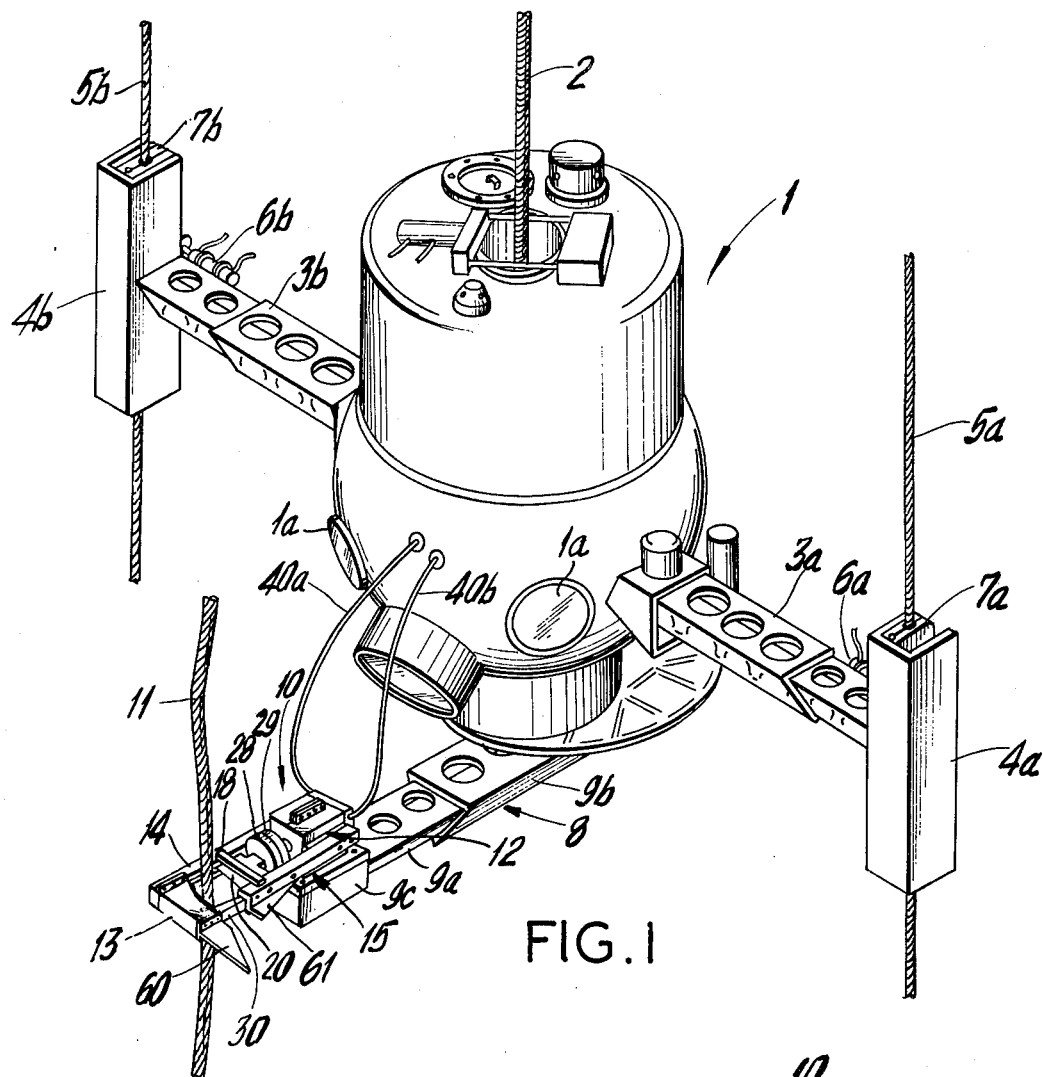
FIG. 1 is a perspective view of a submerged chamber with the cable severing device mounted to the work arm.

Referring now to FIG. 1 there is shown a submerged chamber 1 having a tethered line 2 to a surface station (not shown). Two outwardly extending guide gripping arms 3a and 3b are operatively mounted to chamber 1. At the outward ends of the respective guide gripping arms 3a and 3b there are two vertically disposed guide wire clamps 4a and 4b, respectively. The guide wire clamps 4a and 4b are depicted as being grippingly secured to respective vertically disposed guide wires 5a and 5b by means of hydraulically actuated cylinders 6a and 6b which pivotally engage clamp seats 7a and 7b on respective guide wires 5a and 5b. The guide wires 5a and 5b are fixed at a surface station (not shown) and at the sea floor (not shown). Thus in FIG. 1 the chamber is depicted as being secured at a desired depth in the gripped position.

Extending outwardly from the central bottom portion of the chamber is a work arm 8, said arm 8 being rotatably interconnected with said chamber 1. The arm 8 is also retractably extensible in that arm portion 9a is retractable in and extensible from arm portion 9b by means of a hydraulically actuated cylinder (not shown).

The cable severing device 10 is mounted to the outward end mounting plate 9c of arm portion 9a. The cable severing device 10 is depicted as engaging a vertically disposed cable 11 which is in position to be severed by blade 20 transversely disposed in the device 10.

Referring now to FIGS. 1, 2, 3, 4 and 5 the body of the device 10 comprises a first end portion 12, a second end portion 13 opposed thereto, and a pair of parallel spaced opposite side portions 14 and 15. Side portion 14 is integrally interconnected to end portions 12 and 13. End portion 13 and side portion 14 are connected by means of bolted opposed flanges 13b and 14b respectively which compress gasket 16. Side portion 15 is integrally connected to end portion 12 but spaced from end portion 13. The outwardly facing tapered end face 15a of side 15 is facing relationship with the inward face 13a of end portion 13. Facing ends 13a and 15a form a passageway for cable 11 to be engaged within the body of the device 10. The minimum spaced distance between faces 13a and 15a is sufficient for passage of cable 11 and is sufficient for removal of blade 20.

Side portions 14 and 15 are however interconnected by transversely disposed upper and lower brace members 18 and 19, respectively. The brace members 18 and 19 are bolt mounted to the respective side portions for rigidity to the body.

Figure 4:
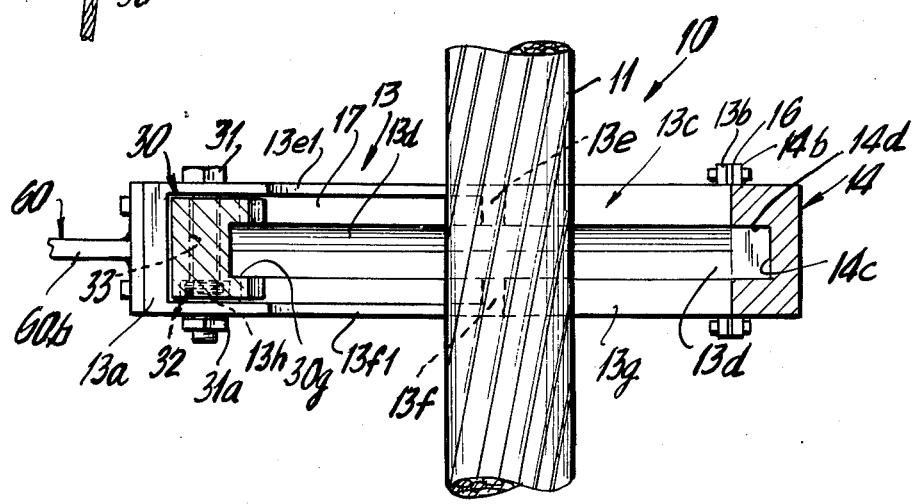
FIG. 4 is a sectional view taken along line 4—4 of FIG. 2.
Figure 2:
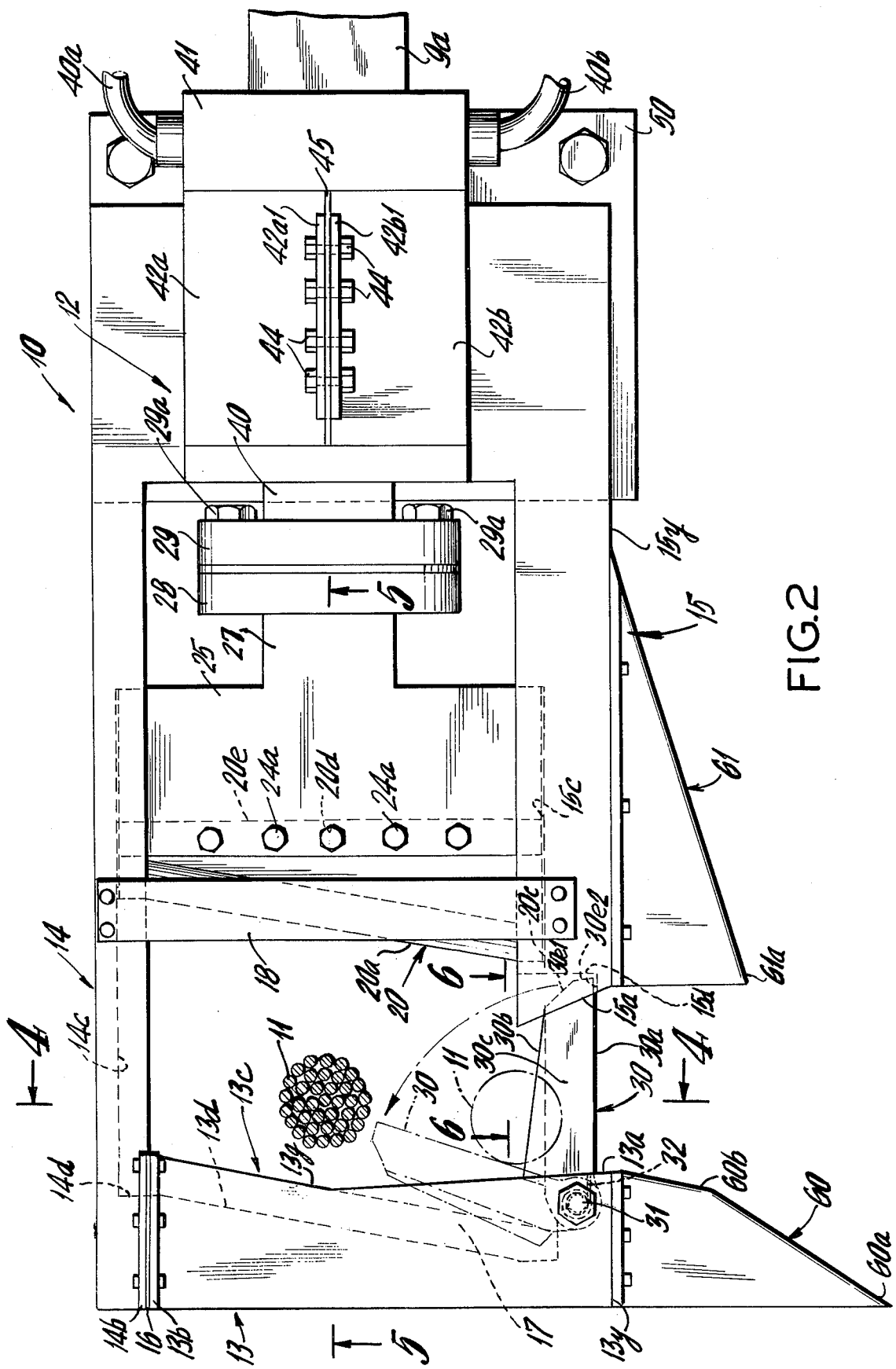
FIG. 2 is a plan view of the cable severing device depicting the cable being engaged within the device.

Side portions 14 and 15 are formed with parallel opposed facing tracks 14c and 15c, respectively. At the forward end of track 14c is a blade seat groove portion 14d which is integrally formed with track 14c. End portion 13 is formed with front 13c. Front portion 13c is formed with a blade seating groove 13d which is coaligned with groove 14d upon mating of end portion 13 with side portion 14 by means of flange members 13b and 14b, respectively. Blade seating groove, 14d and 13d, is canted to conform with canted blade 20. Top and bottom wall portions 13e and 13f of face 13c form a depressed groove 13g for guiding cable 11 on the inwardly disposed faces thereof. Wall portion 13e and 13f are further formed with thinner wall portions 13e1 and 13f1, respectively (see FIG. 4). The walls 13e1, 13f1, 13e and 13f form a recess 17 in end 13 for receiving gate 30 as will be discussed further hereinafter. Side 15 also is formed with a recess groove 15d for housing gate 30 to permit pivotal movement of gate 30. Referring now specifically to FIGS. 2, 4 and 6 wherein the gate 30 is pivotally connected to end portion 13 by means of bolt 31 vertically transversely mounted through bore 13h in end portion 13 and passing through bore 33 of gate 30, and held to end 13 by means of nut 31a. A wind spring 32 is mounted with bolt 31 and gate 30 so that on pivoting of the gate from closed position to the almost full open position (in dashed lines), spring 32 is wound, so as to provide a pivot force to return the date to the closed position. As previously stated gate 30 is formed with bore 33 at one end for pivotal interconnection with end portion 13. Gate 30 has a first side wall 30a and oppositely disposed second side wall 30b, a top wall 30c, a bottom wall 30d, contiguous angled first end wall portions 30e1 and 30e2, and a rounded second end wall portion 30f oppositely disposed to end wall portions 30e1 and 30e2. Side wall 30b is formed with a track groove 30g which is in part formed with end wall portion 30e1 as well.

In the closed gate position as shown in FIGS. 2 and 6, first side wall 30a of gate 30 is in abutment with recessed wall 15d side portion 15. And in the same closed position the blade guide track groove 15c of side portion 15 is coaligned with track groove 30g of gate 30.

The vertical height of gate 30 is less than the recess groove height 15d of side 15 and recess groove 17 of end 13 so that in the closed gate position, gate 30 is slidably received in side portion 15 and in the open gate position, gate 30 is slidably received in end portion 13. Gate side wall 30b is tapered so that is the full open position side wall 30b is in conforming blocking relationship with the canted groove 13d of end portion 13, as said gate 30 is slidably recessed in recess 17.

As stated end wall portion 30e1 is angled with regards to contiguous end wall portion 30e2 and side wall portion 30b as well. This angled construction assures that the opened gate will pass free of the cable 11 and return to the closed position.

Blade 20 comprises a canted sharpened edge portion 20a and a pair of oppositely disposed parallel flange portions or guides 20b and 20c which guides are slidably housed in track grooves 14c and 15c, respectively. Near the end 20e of the blade 20 that is oppositely disposed from edge 20a, vertically disposed, are bolt holes 20d (typical) for bolts 24a (typical) and nut 24b, mounting the blade between plates 25 and 26 integrally formed with the blade mount 27. The maximum dimension of the blade 20 from end 20e to blade edge 20a is less than the minimum passage width between end face 15a of side 15 and face 13a of end 13, to permit removal of the blade from the device.

Blade mount 27 is integrally formed with cylindrical flange 28 which is provided with bolt holes 28a (typical). Flange 28 mates with and is bolted to flange 29 of hydraulic ram 40, by means of bolts 29a (typical). Ram 40 is slidably housed within housing 41 so as to be retractably extensible therefrom. Housing 40 is mounted to end portion 12 of the body by means of symmetrical bolt-mounted retaining members 42a and 42b. The retaining members are integrally formed with end portion 12 so as to be a part thereof. On the top side mating flanges 42a1 and 42b1 of the retaining members are joined by bolts 44 (typical) with gasket 45 provided therebetween. On the bottom side flanges 42a2 and 42b2 are likewise bolt-connected but further engage upright flange 51 of mounting plate 50. Mounting plate 50 is in turn bolt mounted to platform 9c which is in turn formed with work arm portion 9a. By this manner of construction the ram housing is securely connected to the work arm 8 while the ram 40 is properly aligned in the body of cable severing device 10.

At the inward side of hydraulic ram housing 41 are hydraulic fluid conduits 40a and 40b for the respective inward and outward flow of hydraulic fluid. Conduits 40a and 40b are interconnected to hydraulic actuation means with chamber 1. Directed flow of the hydraulic fluid causes retraction or extension of ram 40 in housing 41. The ram extension in turn causes advancement of blade 20 to the blade seat 13d of end 13.

During such blade advancement blade guides 20b and 20c slide within tracks 14c and 15c, respectively.

Referring now again to FIG. 2, there is shown an angled flange 60 bolt-mounted to outward side face 13y of end portion 13. Said flange 60 extends outwardly from the cable severing device 10 and is formed with a first angled portion 60a at the outward end thereof and a second angled portion 60b on the inward side thereof. This projecting flange 60 serves as a cable engaging guide member as will be further discussed hereinafter. A second projecting flange 61 is bolt-mounted to the side face 15y of end portion 15 and is formed with an angled projecting portion 61a which is spacedly disposed from second angled portion 60b of first flange 60. Flange 61 further assists to guide a cable into the body of the device 10.

Figure 7:
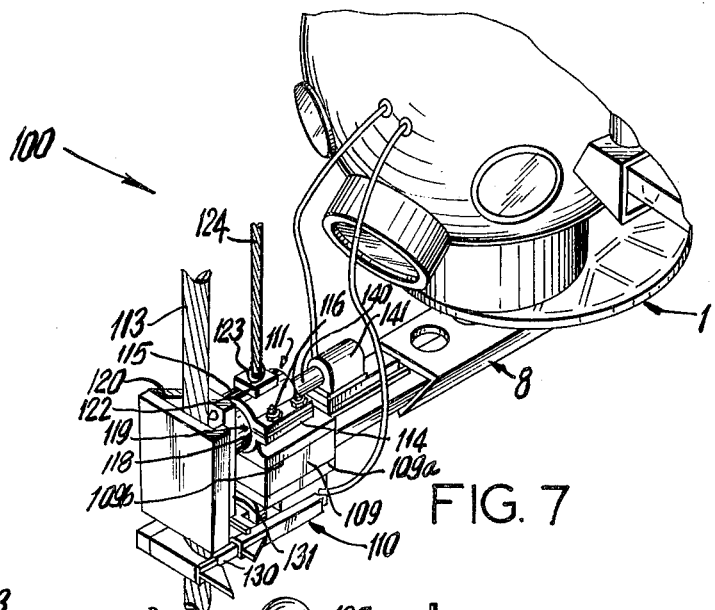
FIG. 7 is a partial perspective view of another embodiment of the invention mounted to the work arm.
Figure 8:
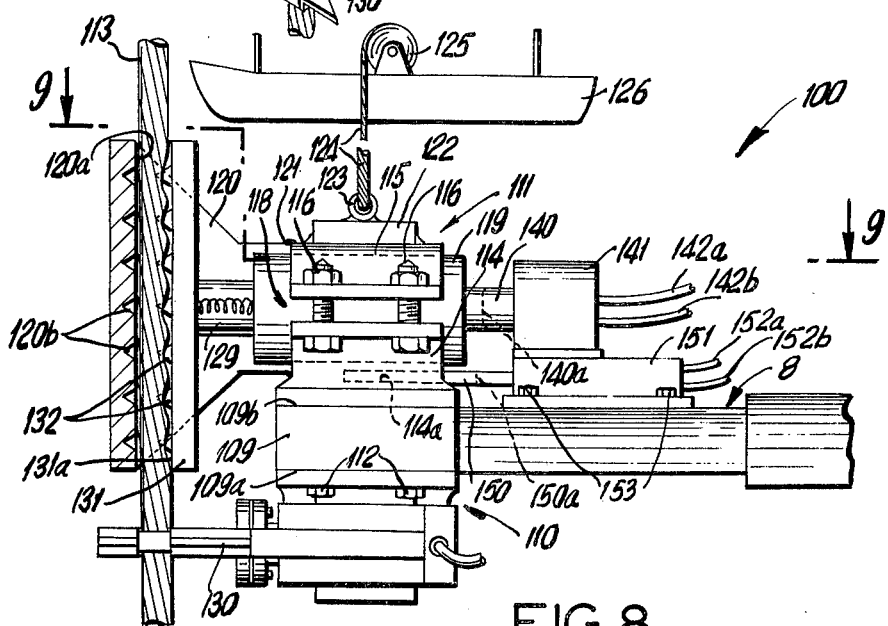
FIG. 8 is an elevational view of the embodiment of FIG. 7.
Figure 9:
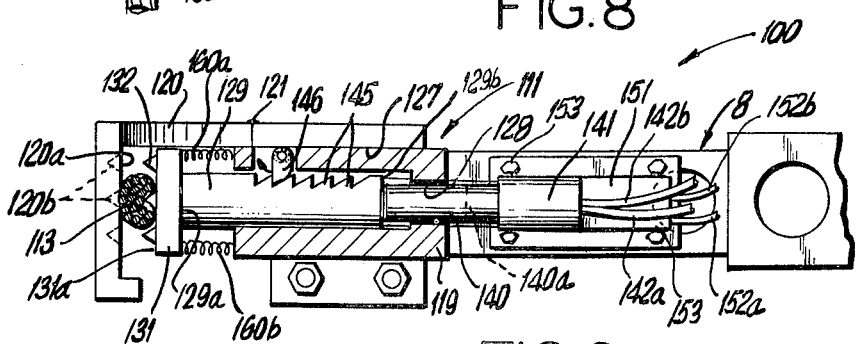
FIG. 9 is a sectional view taken along line 9—9 of FIG. 8.

Referring now to FIGS. 7, 8 and 9 there is shown another embodiment of the invention, generally designated as 100 mounted to work arm 8 of submergible chamber 1. Device 100 comprises a cable severing member 110 and a cable gripping member 111 mounted to opposite sides of arm portion 109. Cable severing member 110 is similar in design and construction as previously described device 10 of the aforesaid embodiment. Cable severing member 110 is however in this embodiment mounted to the lower face 109a of arm portion 109, and the cable gripping member is mounted to the upper face 109b of arm portion 109.

Cable severing member 110 is fixedly mounted to face 109a by means of four bolts 112 (typical), so that with movement of arm 8 and attached arm portion 109, the cable severing member 110 likewise is moved. In the arcuate movement of the cable severing member, cable 113 is received in cable severing device and engaged in place by gate 130 in a manner similar to that as previously described.

Cable gripping member 111 comprises a base plate 114 which rests on arm portion surface 109b. Base plate 114 is bolted to adjoined top plate 115 by means of four bolts and nuts 116 (typical) so as to form a C-clamp 118 for retaining housing 119. A fixed clamp portion 120 extends outwardly from and is integrally joined to C-clamp 118 as at 121. Plate 122 is welded to the top of top plate 115 and is provided with a shackle 123 for lift wire 124. Lift wire 124 is attached to a reel or drum 125 of surface ship 126 so that the wire 124 may be taken to the surface as more fully described hereinafter.

Housing 119 is formed with a major axial bore 127 and a minor coaxial bore 128. Ram member 129 slidably resides in bore 127. At the outward end 129a of ram 129 is mounted a transversely disposed plate 131 being formed with a plurality of teeth or projections 132 on the outward face 131a thereof. Face 131a opposes face 120a of clamp portion 120, and is formed with recesses 120b for receiving teeth 132. That is when ram 129 is fully extended in the outward direction face 131a contacts face 120a and teeth 132 reside in recesses 120b. In actual practice however when cable 113 is engaged in cable severing device 110, said cable 113 is also disposed between opposed ram face 131a and clamp face 120a, so that with outward movement of ram 129, teeth 132 pressingly deformably engage cable 113 against clamp face 120a to the desired degree.

At the inward side 129b of the ram 129, ram 140 slidably engages bore 128 and contactingly abuts ram 129 so as to move same. Ram 140 is extensibly, retractably moved by hydraulic cylinder 141 which is fixedly mounted to work arm 8. Hydraulic lines 142a, 142b interconnect cylinder 141 with chamber 1, so that ram 140, and in turn ram 124 may be actuated to grip cable 113, may be actuated by an operator from within chamber 1. Ram 140 may be fully retracted as shown in broken line 140a so as to be free and clear of housing 119. Of course ram 129 remains in the larger bore 127 of said housing with the full retraction and disengagement of ram 140.

Ram 129 is formed with ratchet teeth 145 which are formed to engaged spring-loaded ratchet 146. With the outward movement of ram 129 by ram 140, so as to grip cable 113, ratchet 146 rotates (as shown in arrow FIG. 9) into position in the series of teeth 145. When the desired gripping of the cable occurs, ram 140 and in turn ram 129 cease to move outwardly, and ratchet 146 further blocks the return movement of the ram 129. With the retraction of ram 140 to the fully retracted position 140a, ratchet 146 holds ram 129 in position so that cable 113 remains grippingly deformed by teeth 132 between clamp face 120a and ram face 131a. The internal stresses in the deformed wires of cable 113 would tend to cause ram 120 to retract but ratchet 146 prevents this from occuring.

A pair of springs 160a, 160b assist in the full return of the ram 129, after gripping the cable and taking the gripped cable to the surface. In disengagement ram 120 is advanced somewhat further to further deform the cable 113, so as to permit the ratchet to be pivoted away from the teeth and held in the fully pivoted position. The ram 129 is then fully retracted thereby freeing the cable.

It is also within the contemplation of this invention to have the ratchet 146 removable from its pivot seat so as to permit retraction of the ram thereby freeing the cable from the device.

It is to be borne in mind that while the device as hereindescribed is particularly useful in cutting cables, it is not necessary so limited but may be employed for cutting pipes, rods and the like.

It is also within the contemplation of this invention to remotely actuate the severing and gripping device from the surface.

Base plate 114 is formed with a rectilinear recess 114a for receiving retractably extensibly plate 150. Plate 150 is housed in and retractably extensibly moved by hydraulic device 151 which is interconnected to chamber 1 by means of hydraulic lines 152a and 152b.

Hydraulic device 151 is mounted to arm 8 by means of bolts 153 (typical) and hydraulic cylinder 141 is mounted to the top of hydraulic device 151. Plate 150 may be fully retracted to be free and clear of the base plate 114 as well as housing 119, for reasons hereinafter appearing.

With plate 150 in the fully extended position and with ram 140 in the fully extended position, housing 119 is mounted to arm portion 109, and respectively cable 113 is gripped in the clamp. After severing the cable and then with the full retraction of plate 150 and ram 140, the gripping member 111 is thereby disconnected from arm portion 109, and arm 8, and the severed, gripped cable may then be brought to the surface by means of lift wire 124.

In a normal cable severing operation, chamber 1 is guidingly submerged to a desired depth by means of the guide gripping arms 4a and 4b slidably engaging guide wires 5a and 5b, respectively. At the desired depth hydraulic cylinders 6a and 6b are actuated to close gripping seats 7a and 7b so as to grippingly hold the chamber 1 at such depth. Thereafter work arm 8, specifically arm assembly portion 9a is outwardly extended to a distance at least equal to the distance if to be severed cable 11 from the chamber. Work arm 8 is then rotated counter-clockwise (viewed downwardly) so as to provide circumferential translation of device 10. As device 10 approaches cable 11, cable 11 generally first engages first flange 60 and then slides on the inward face of flange 60, past flange portion 60b and flange portion 61a of second flange portion 61.

The cable next contactingly engages face 30a of gate 30 and upon continued circumferential travel the cable forcibly causing pivoting of gate 30 away from recess wall 15d of side portion 15. The cable thus causes gate 30 to pivot open (see broken line drawing of FIG. 2). Gate 30 in full opening is received in recess 17 of end portion 13. Cable 11 contactingly slidably engages face 30a of gate 30 and slidably progresses toward end wall portion 30e2 of gate 30. Upon cable 11 passing clear of end wall portion 30e2, the cable force is removed and gate 30 springs back to the original closed position in side portion 15. Spring 32 provides the return pivot force.

Upon closing of the gate 30 as aforesaid, cable 11 is encompassed within the body of device 10, and is in position to be severed. Work arm 9c may be retracted slightly to ensure that cable 11 is centrally disposed within the device and pressingly engages groove 13g of the end portion 13.

Ram 40 is then hydraulic actuated to rapidly extend from housing 41, thereby advancing blade 20 towards cable 11. Blade guides 20b and 20c are slidably advanced within, initially, track sections 14c and 15c of the side portions, and then within side portion track section 14c and gate track portion 30c.

The blade edge contacts the cable and thus is driven through the cable and comes to rest in groove 13d. The ram 40 may be retracted to its initial position for subsequent cable severing operations.

In operation arm 8 of FIG. 7 is horizontally rotated to engage cable 113 with severing member 110 and within the retracted faces of clamping member 111. The cable 113 is then gripped by means to the extension of rams 140 and 129 and further held in place by means of ratchet 146. Thereafter plate 150 is fully retracted to position 150a as to free gripping member 111 from arm portion 109 and arm 8. The operator in chamber 1, then notifies an operator on ship 126 to actuate reel or drum 125 to take up lift wire 124. The take up of lift wire 124 in turn causes the gripping member 114 with the severed, gripped cable 113 to be brought to the surface.

All of the aforesaid operations are performed remotely from within chamber 1 with visual observation through one of several ports 1a (typical). As stated diver assistance is generally unnecessary, for both embodiments.

To remove blade 20 for repair or replacement, gate is held open and ram 40 is slowly extended so that the blade is aligned with the gate opening formed by face 15a of side portions 15 and face 13a of side portion 13. Bolts 24a (typical) are removed and the blade slides passed said opening. For blade insertion, the operations as immediately aforesaid are reversed.

In the operation of the embodiment as shown in FIGS. 7-9, the severing member is operated in a similar manner to that as heretofore described. As the cable is being encompassed in the severing member, the cable is also encompassed in the gripping member by a similar gate action. Once the cable is encompassed in the gripping member, and before severing the cable, the gripping means is actuated by the operator in the chamber so as to deformably grip the cable and hold the cable. After the blade severs the cable, the operator then causes retraction of the gripping member retaining bar and retraction of the gripping means actuating ram. The gripping means however remain in the actuated or closed mode by virtue of the ratchet lock. With the gripping member disengaged from the work arm, the operator in the manned submerged chamber notifies the surface operator to take the severed cable to the surface by means of the lift wire attached to the gripping member.

It is of course to be understood that the invention may be constructed in other manners and the parts associated in different relationship and therefore is not intended that the invention be limited to the embodiment heretofore described but is to be construed by the claims hereunto appended.

What is claimed is:

1. A device to sever cables comprising, a body having a first end portion, a second end portion opposed thereto and a pair of spaced opposed side portions being disposed between said first and second end portions, one side portion interconnecting said end portions and the other side portion being connected to the first end portion and spaced from the second end portion, means adaptably formed with said first end portion to attach said device to a horizontally rotatable arm so as to provide circumferential travel to said device, a pair of parallel opposed facing blade track means, each of said track means being formed with one each of said side portions, blade means being horizontally disposed in said body and facing said second end portion and being formed with a pair of blade guide means for slidable engagement with respective track means so that said blade means is movable from said first end portion to said second end portion, and blade drive means adaptably mounted to said body at said first end and interconnected to said blade means to drive said blade means from said first end portion to said second end portion and cable passage means being integrally formed with a vertically disposed face of said second end portion and a vertically disposed face of said other side portion spaced from said second end portion to permit passage of a vertically disposed cable upon circumferential travel of said device towards said cable, said cable being positioned within the body of said device between said opposed end and side portions.

2. The device of claim 1, further comprising blade seating means being formed on said second end portion in opposed facing relationship to said blade means and being disposed between said track means.

3. The device of claim 2, wherein said cable engaging means further comprises gate means having an inward side and an outward side, said inward side being formed with blade track means and said outward side being formed with means to contactingly engage said cable, means to pivotally engage one end of said gate means with said second end portion juxtaposed to said other side portion of said body, means formed on the other end of said gate means to blockingly engage said other side portion of said body when said gate means is in a first pivoted position, whereat said first pivoted position said gate track means and said other side portion track means of said body are coaligned.

4. The device of claim 3, wherein said inward side of said gate means is tapered to blockingly engage said blade seating means when said gate means is in a second pivoted position, said gate means being moved from said first pivoted position to said second pivoted position by the cable contacting said outward side of said gate means during circumferential travel of said device.

5. The device of claim 4, further comprising spring means interconnected with said gate means and said second end portion of the body so that in said second pivoted position said cable slides clear of said gate means and said gate means is then returned to said first pivoted position by said spring means.

6. The device of claim 2, wherein said blade means comprises a canted blade edge; and correspondingly, canted blade seating means formed in said second end portion of said body.

7. The device of claim 2, wherein said drive means comprises a retractably extensible cylinder, one end thereof being connected to said blade means and the other end thereof being interconnected to actuating means so as to be retractably extended thereby.

8. The device of claim 1, further comprising means to disconnectably connect said blade means from said drive means.

9. In combination with a submergible chamber having an outwardly extending, horizontally rotatable work arm, means at the outward end of said arm to adaptably secure a device to sever cables, said device comprising, a body having a first end portion, a second end portion opposed thereto and a pair of spaced opposed side portions being disposed between said first and second end portions, one side portion interconnecting said end portions and the other side portion being connected to the first end portion and spaced from the second end portion, means adaptably formed with said first end portion to attach said device to a horizontally rotatable arm so as to provide circumferential travel to said device, a pair of parallel opposed facing blade track means, each of said track means being formed with one each of said side portions, blade means being horizontally disposed in said body and facing said second end portion and being formed with a pair of blade guide means for slidable engagement with respective track means so that said blade means is movable from said first end portion to said second end portion, and blade means from said first end portion to said second end portion and cable passage means being integrally formed with a vertically disposed face of said second end portion and a vertically disposed face of said other side portion spaced from said second end portion to permit passage of a vertically disposed cable upon circumferential travel of said device towards said cable, said cable being positioned within the body of said device between said opposed end and side portions.

10. The combination of claim 9, wherein said drive means comprises a retractably extensible cylinder, one end thereof being connected to said blade means and the other end thereof being interconnected to hydraulic actuating means so as to be retractably extended thereby, and means to actuate said hydraulic actuating means, from within said chamber.

11. The device of claim 1, further comprising a cable guide flange integrally connected to said second end portion and extending therefrom for slidably contacting said cable upon circumferential travel of said device.

12. The device of claim 11, further comprising a second cable guide flange integrally connected to said other side portion and extending therefrom and spaced from said first guide flange so as to form extended cable passage means.

13. The device of claim 9, wherein said cable engaging means further comprises gate means having an inward side and an outward side, said inward side being formed with blade track means and said outward side being formed with means to contactingly engage said cable, means to pivotally engage one end of said gate means with said second end portion juxtaposed to said other side portion of said body, means formed on the other side portion of said body when said gate means is in a first pivoted position, whereat said first pivoted position said gate track means and said other side portion track means of said body are coaligned.

14. The device of claim 13, further comprising spring means interconnected with said gate means and said second end portion of the body so that in said second pivoted position said cable slides clear of said gate means and said gate means is then returned to said first pivoted position by said spring means.

15. The device of claim 9, further comprising a cable guide flange integrally connected to said second end portion and extending therefrom for slidably contacting said cable upon circumferential travel of said device.

16. The device of claim 15, further comprising a second cable guide flange integrally connected to said other side portion and extending therefrom and spaced from said first guide flange so as to form extended cable passage means.

17. A device to sever cables comprising a severing member, means to attach said severing member to a movable arm of a submergible chamber said severing member being formed with means to receive a cable with the movement of said arm, and means to sever said cable, wherein said receiving means comprises pairs of opposed sides, one of said sides being spaced from another side to permit the cable to pass therebetween and reside within the severing member, and means to engage said cable comprising gate means pivotally disposed in said space to receive said cable, said gate means being formed with track means for guiding said means to sever said cable with the gate pivotally closed.

18. The device of claim 17, wherein said gate means further comprises spring means so that with movement of said arm, said gate means contactingly engages the cable on the outward side of the gate means and with pivoting of the gate said cable move past the gate, and the gate by said spring action retracts to its previous position so that said cable is then engaged between all of said sides.

19. The device of claim 17, wherein said means to sever said cable comprises a retractably extensible blade, and track means disposed in at least two of said opposed sides for guiding said blade.

20. The device of claim 17, further comprising a gripping member comprising means to grip said cable after the arm has caused the cable to be received by the receiving means, wherein said gripping member is disconnectably connected to said arm, and a lift wire connected to said gripping member.

21. The device of claim 20, further comprising means to actuate disconnection of said gripping member from said arm of said gripping member from said arm after severing said cable, so that said severed cable remains gripped while remaining attached to said lift wire.

22. The device of claim 21, further comprising means to take said lift wire, gripping means and severed cable to the surface.

23. The device of claim 21, said means to disconnectably connect said gripping member comprises a retractably extensible ram, and means formed in said gripping member to receive said extended ram, and said means to actuate said disconnection comprising a fluid cylinder connected to said ram to cause retraction of same.

24. The device of claim 20, said gripping means further comprising means to deform said cable in the gripping of said cable.

25. The device of claim 20, wherein said gripping member is mounted to one side of said arm and said severing member is mounted to another side of said arm.

26. The device of claim 25, wherein the gripping member is spacedly disposed above said severing member.

27. The device of claim 25, wherein said arm is horizontally rotatable, and said gripping member and said severing member are in parallel spaced disposition.

28. The device of claim 27, wherein the gripping member is spacedly disposed above said severing member.

29. A device to sever cables comprising a severing member, means to attach said severing member to a movable arm of a submergible chamber said severing member being formed with means to receive a cable with the movement of said arm, and means to sever said cable, further comprising a gripping member comprising means to grip said cable after the arm has caused the cable to be received by the severing member, and means to disconnectably connect said gripping member to said arm, and means to connect lift means to said gripping member.

* * * * *